Aug. 13, 1940. W. H. BASELT 2,211,712
FREIGHT CAR BRAKE
Filed Oct. 8, 1938 4 Sheets-Sheet 1

Fig. 1

INVENTOR.
Walter H. Baselt,
BY
ATTORNEY.

Aug. 13, 1940.　　　W. H. BASELT　　　2,211,712
FREIGHT CAR BRAKE
Filed Oct. 8, 1938　　　4 Sheets-Sheet 2
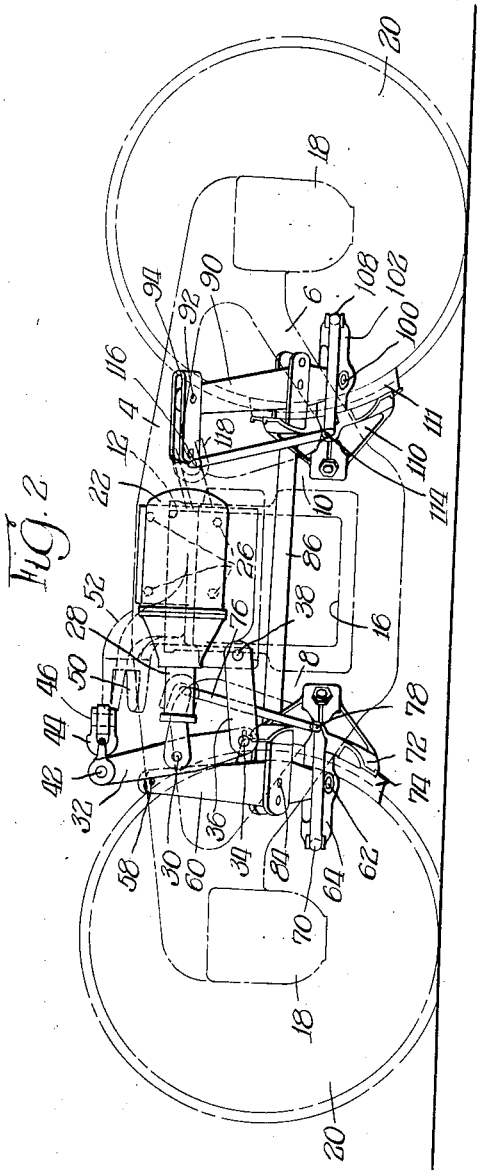
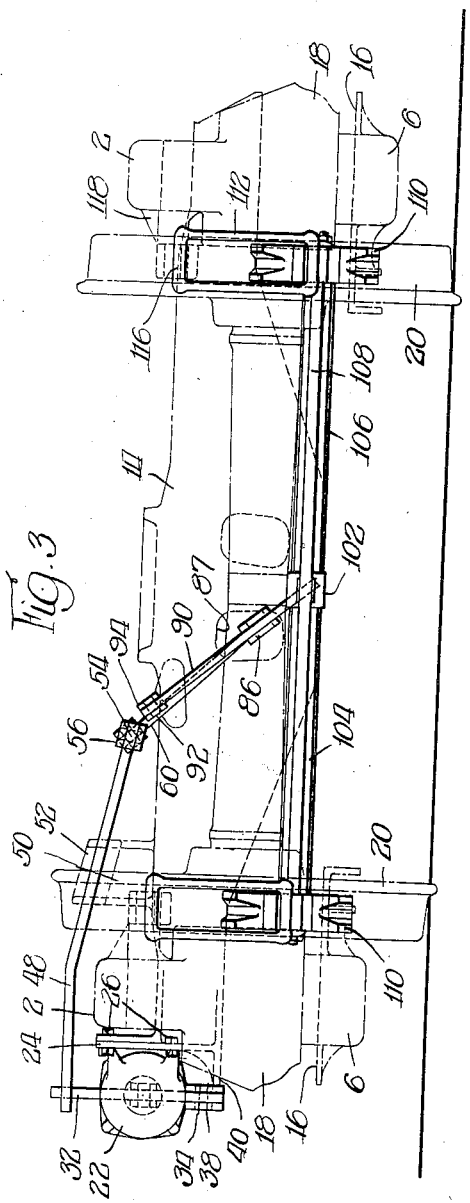
INVENTOR.
Walter H. Baselt,
BY
ATTORNEY.

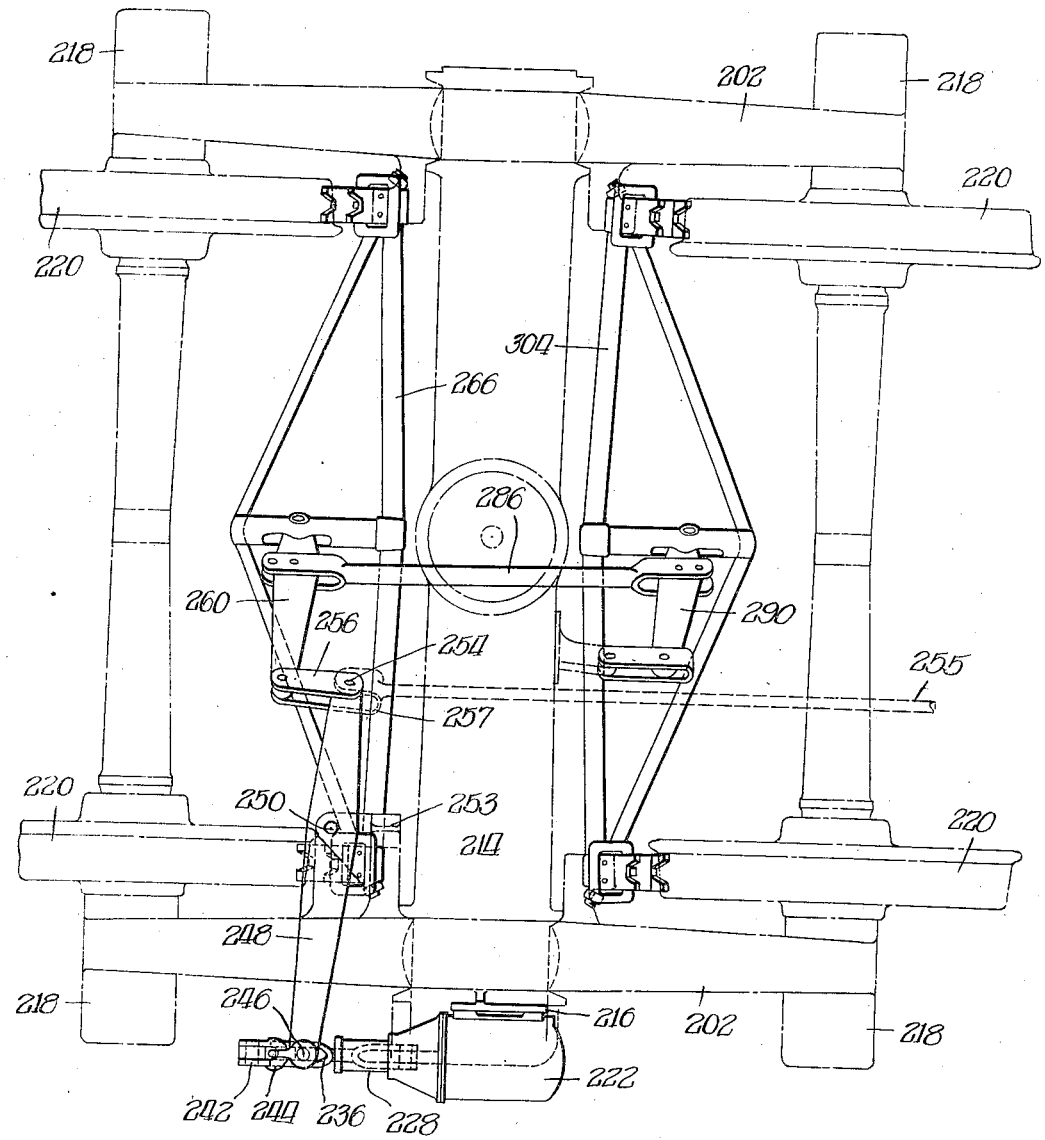

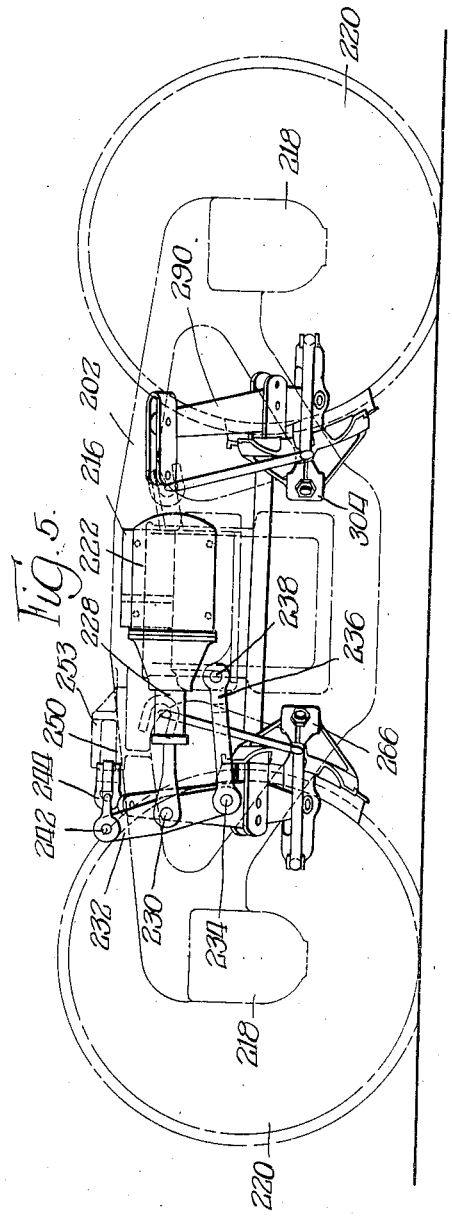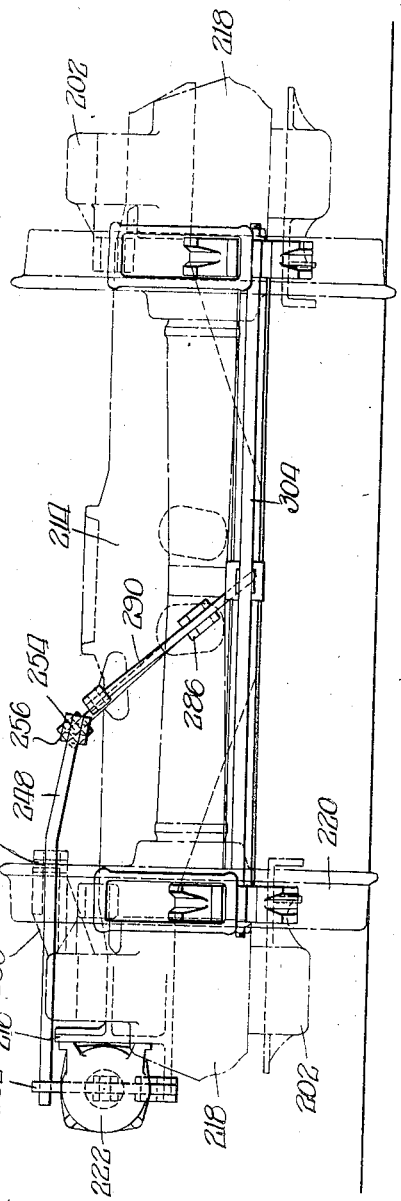

Patented Aug. 13, 1940

2,211,712

UNITED STATES PATENT OFFICE 2,211,712

FREIGHT CAR BRAKE

Walter H. Baselt, Chicago, Ill., assignor to American Steel Foundries, Chicago, Ill., a corporation of New Jersey Application October 8, 1938, Serial No. 233,930

23 Claims. (Cl. 188—52)

My invention relates to railway brake rigging and more particularly to a type of rigging generally designated unit cylinder wherein the power means is carried by some member of the truck frame.

An object of my invention is to design a simple, compact and efficient form of unit cylinder brake arrangement for a four wheel freight car truck of generally conventional design. Such a truck commonly consists of truss type side frames and a bolster joining said frames and serving to carry the weight of the car body. In the modification I have shown the truck is of the spring plankless type wherein the bolster, in conjunction with the wheel and axle assemblies, serves to retain the truck square. It will readily be understood, however, that my novel brake arrangement is equally suitable for use on conventional types of trucks whether or not a spring plank is used.

A more specific object of my invention is to design a unit cylinder brake arrangement for a four wheel car truck wherein the power means is mounted on the bolster outwardly of one side frame.

Yet another object of my invention is to design a brake arrangement of the above described type wherein a single substantially horizontal lever will transmit the braking force from the power means outwardly of the truck to the brake lever associated with one of the brake beams, in one modification whereof said horizontal lever is fulcrumed from the truck bolster and in another from the side frame.

Figure 1 is a top plan view of a four wheel freight car truck brake arrangement embodying one modification of my invention;

Figure 2 is a side elevation of the truck and brake arrangement shown in Figure 1;

Figure 3 is an end elevation of the truck and brake arrangement shown in Figures 1 and 2, the view being taken from the right as seen in those figures;

Figure 4 is a top plan view of another modification of a four wheel truck and brake arrangement embodying my invention;

Figure 5 is a side elevation of the truck and brake arrangement shown in Figure 4; and Figure 6 is an end elevation of the truck and brake arrangement shown in Figures 4 and 5, the view being taken from the right as seen in those figures.

Describing in more detail the modification shown in Figures 1 to 3, the truck comprises the spaced side frames 2, 2 of generally conventional truss type having the compression member 4 and the tension member 6 with the spaced columns 8 and 10 forming therebetween the bolster opening 12 through which may extend the end of the bolster 14, said bolster end being supported by suitable resilient means (not shown) which may be seated on the spring seat 16 beneath said bolster opening. The tension member 6 and compression member 4 merge adjacent their ends with the integrally formed journal boxes 18, 18, said boxes serving as the usual means of connection to the journal ends of the wheel and axle assemblies 20, 20.

The power means or brake cylinder 22 is mounted on the projecting bolster end as best seen in Figure 1, said bolster end having the specially formed vertical flange or bracket 24 (Figure 3 to which said power means may be secured as at 26, 26. The brake cylinder 22 is arranged longitudinally of the truck and the piston rod 28 thereof has a pivotal connection as at 30 to the dead vertical cylinder lever 32, the lower end of said cylinder lever being fulcrumed as at 34 from the link 36, the opposite end of said link being secured as at 38 to the bracket 40 formed on the end of the bolster. The upper end of the cylinder lever 32 is pivotally connected as at 42 to the clevis means 44, the opposite end of which is connected as at 46 to the outer end of the dead lever 48, said dead lever being fulcrumed as at 50 from the bracket 52 integrally formed on the bolster 14 as best seen in Figure 3. It may be noted that the dead lever 48 is a bent lever, the outer end of which is substantially horizontal, but the major portion of whose length is diagonally arranged in order to provide maximum clearance for the car body.

The inner end of the dead lever 48 has a pivotal connection as at 54 to the links 56, the opposite ends of said links having a pivotal connection as at 58 to the upper end of the live truck lever 60, the lower end of which is pivotally connected as at 62 to the fulcrum 64 of the brake beam 66, said beam being of conventional truss type with the compression member 68 and the tension member 70, said beam supporting at its opposite ends brake heads 72, 72 with the associated brake shoes 74, 74 arranged to cooperate with the peripheries of the adjacent wheels. Support for the beam 66 is provided at each end thereof by means of the hangers 76, 76, said hangers being pivotally connected at their lower ends as at 78 to the brake heads 72, 72 and being supported at their upper ends as at 80 from the brake hanger brackets 82, 82 integrally formed with the side frames.

Intermediate the ends of the live truck lever 60 is pivotally and adjustably connected as at 84 one end of the compression rod 86, said rod extending through the opening 87 provided therefor in the walls of the bolster, the opposite end of said rod having a pivotal and adjustable connection as at 88 to a point intermediate the ends of the dead brake lever 90, the upper end of which is adjustably fulcrumed as at 92 from the strap 94, the opposite end of said strap having a pivotal connection as at 96 to the fulcrum 98 which may be secured on the bolster 14 in any convenient manner. The lower end of the dead brake lever 90 has a pivotal connection as at 100 to a point intermediate the ends of the brake beam strut or fulcrum member 102 of the truss beam 104, said beam having the compression member 106 and the tension member 108 and carrying at its opposite ends in the usual manner the brake heads 110, 110 with shoes 111, 111, said beam being supported by the hangers 112, 112, said hangers having pivotal connections at their lower ends as at 114, 114 to the respective brake heads and being supported at the upper ends as at 116, 116 from the brake hanger brackets 118, 118 integrally formed with the side frames.

A convenient hand brake connection is provided for this hand brake rigging at the pivotal point 54 at the inner end of the dead fulcrum lever 48. At said point may be connected the pull rod 55 through the jaw end 57 thereof; or, if desired, flexible means may be used instead of said pull rod.

In operation, assuming the parts to be in released position, actuation of the power means 22 moves the piston rod 28 to the left (Figure 2) and through the connection at 30 rotates the cylinder lever 32 in a counter-clockwise direction about the movable fulcrum 34 at its lower end. Said movement of the dead cylinder lever 32 is transmitted through the clevis 44 to the fulcrum lever 48 which is thus rotated in a clockwise direction about the pivot 50 intermediate its ends, thus through the link 56 causing rotation in a counter-clockwise direction (Figure 1) of the live truck lever 60 about the fulcrum 84 intermediate its ends and moving the brake beams 60 to the left until the brake shoes 74, 74 engage the peripheries of the adjacent wheels at opposite sides of the truck. Continued application of the power causes the live truck lever 60 to rotate further in a counter-clockwise direction about the fulcrum 62 at its lower end, thus moving the compression bar 86 to the right and causing clockwise rotation of the dead truck lever 90 (Figure 1) about the fulcrum 92 at its upper end until the brake shoes at the opposite end of the truck are brought into engagement with the peripheries of the adjacent wheels. Release of the power means causes the parts to move in directions reverse to those just described, thus releasing the brakes. Those familiar with the art will recognize that the rigging is dead ended at the fulcrum 94 and that the effective application of the power occurs only when the parts are drawn up tight. The above description of the method of operation is only to clarify the manner in which the various parts function.

The modification shown in Figures 4 to 6 differs from that shown in Figures 1 to 3 in that the fulcrum lever, forming the operative connection between the power means at the outside of the truck and the brake means inwardly thereof, is mounted on a bracket carried by the side frame instead of by the bolster. Otherwise, the structures are substantially the same.

In the modification shown in Figures 4 to 6 the truss type side frames 202, 202 have the connecting bolster 214, the ends of which are received within the bolster openings of the side frames and are supported in the usual manner therein on resilient means (not shown). The integral journal boxes 218, 218 at the ends of the side frames form the conventional means of connection to supporting wheel and axle assemblies 220, 220 at opposite ends of the truck.

One end of the bolster 214 is extended and provided with the special bracket 216 as a means of support for the power means or brake cylinder 222 in a manner similar to the modification previously described. The piston rod 228 of the brake cylinder 222 has a pivotal connection as at 230 to the vertical dead cylinder lever 232, the lower end of which is movably fulcrumed as at 234 from the tension rod or link 236, the opposite end of which bar is pivotally secured as at 238 to the bracket 216 on the end of the bolster. The upper end of the cylinder 232 has a pivotal connection as at 242 to the clevis means 244, the opposite end of said clevis means having a pivotal connection as at 246 to the dead fulcrum lever 248. The dead lever 248 is fulcrumed intermediate its ends as at 250 from the bracket 253 integrally formed on the side frame 202. The inner end of the dead fulcrum lever 248 is pivotally connected as at 254 to straps 256, the opposite end of said straps being connected to the upper end of the live truck lever 260, said lever forming a means of connection to operate the truss beam 266 and through the compression bar 286 also actuating the dead truck lever 290 and the associated beam 304. It will be understood that the brake beams 266 and 304 and their manner of support and operation are identical to that described in the modification shown in Figures 1 to 3, the only difference in the two structures being that previously described, namely, the manner in which the dead fulcrum lever 248 is supported from the side frame instead of from the bolster.

It will be understood by those skilled in the art that mounting of the power means or brake cylinder 222 on the resiliently carried bolster 214 makes necessary some provision for vertical movement of the cylinder lever 232. Said vertical movement is provided by the swinging fulcrum link 236 already described and by the clevis connection 244 at the top of the cylinder lever 232.

This brake rigging provides a convenient means of hand brake connection similar to that shown in the previous modification, said connection being at the inner end of the dead fulcrum lever 248 and in the form of the pull rod 255 having the jaw end 257.

The operation of the brake rigging in the modification shown in Figures 4 to 6 is substantially identical to that described for Figures 1 to 3 with the sole difference that the fulcrum lever 248 is carried by the side frame instead of the bolster.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. In a four wheel railway truck, a truss side frame having a bolster opening, a bolster extending through said opening, spaced wheel and axle assemblies, power means mounted on said bolster outwardly of said frame, fulcrum means on said bolster inwardly of said frame, a cylinder lever fulcrumed on said bolster and operatively connected to said power means, brake rigging comprising truss beams supported intermediate said wheels and having center struts, live and dead truck levers connected respectively to said struts, a compression rod interconnecting said truck levers, said dead truck lever being fulcrumed from said bolster and said live truck lever having an operative connection to said cylinder lever, said operative connection comprising a transversely extending dead lever pivoted in said fulcrum means and having its inner end operatively connected to said live truck lever and its outer end operatively connected to said cylinder lever, and hand brake means operatively connected to said dead fulcrum lever.

2. In a four wheel railway truck, a truss side frame having a bolster opening, a bolster extending through said opening, spaced wheel and axle assemblies, power means mounted on said bolster outwardly of said frame, fulcrum means on said bolster inwardly of said frame, a cylinder lever fulcrumed on said bolster and operatively connected to said power means, brake rigging comprising truss beams supported intermediate said wheels and having center struts, live and dead truck levers connected respectively to said struts, and a compression rod interconnecting said truck levers, said dead truck lever being fulcrumed from said bolster and said live truck lever having an operative connection to said cylinder lever, said operative connection comprising a transversely extending dead lever pivoted in said fulcrum means and having its inner end operatively connected to said live truck lever and its outer end operatively connected to said cylinder lever.

3. In a four wheel railway truck, a truss side frame having a bolster opening, a bolster extending through said opening, spaced wheel and axle assemblies, power means mounted on said bolster outwardly of said frame, fulcrum means on said bolster inwardly of said frame, a cylinder lever fulcrumed on said bolster and operatively connected to said power means, brake rigging comprising truss beams supported intermediate said wheels and having center struts, live and dead truck levers connected respectively to said struts, and a compression rod interconnecting said truck levers, said dead truck lever being fulcrumed from said bolster and said live truck lever having an operative connection to said cylinder lever, said operative connection comprising a dead lever pivoted in said fulcrum means and connected between said live truck lever and said cylinder lever.

4. In a four wheel railway car truck, a truss type said frame, a bolster extending through said frame, wheel and axle assemblies, power means and fulcrum means mounted on said bolster on opposite sides of said frame, and brake rigging for said car truck in the form of truss type beams supported intermediate the wheels, a dead brake lever associated with one beam, a live brake lever associated with the other beam, a connection between said brake levers, said dead brake lever being fulcrumed from said bolster, and said live brake lever having an operative connection to said power means, said operative connection comprising a dead lever pivoted in said fulcrum means and having its inner end connected to said live truck lever, a vertical cylinder lever having its lower end fulcrumed from said bolster, its upper end connected to said pivoted lever, and a point intermediate its ends connected to said power means.

5. In a four wheel railway car truck, a truss type side frame, a bolster extending through said frame, wheel and axle assemblies, power means and fulcrum means mounted on said bolster on opposite sides of said frame, and brake rigging for said car truck in the form of truss type beams supported intermediate the wheels, a dead brake lever associated with one beam, a live brake lever associated with the other beam, a connection between said brake levers, said dead brake lever being fulcrumed from said bolster, and said live brake lever having an operative connection to said power means, said operative connection comprising a cylinder lever fulcrumed at one end from said bolster and connected intermediate its ends to said power means, and a dead lever pivoted intermediate its ends from said fulcrum means and connected at one end to said live truck lever and at its other end to said cylinder lever.

6. In a four wheel railway car truck, a truss type side frame, a bolster extending through said frame, wheel and axle assemblies, power means and fulcrum means mounted on said bolster on opposite sides of said frame, and brake rigging for said car truck in the form of truss type beams supported intermediate the wheels, a dead brake lever associated with one beam, a live brake lever associated with the other beam, a connection between said brake levers, said dead brake lever being fulcrumed from said bolster, and said live brake lever having an operative connection to said power means, said operative connection comprising a vertical cylinder lever fulcrumed from said bolster and connected to said power means, and a dead lever pivoted in said fulcrum means and interconnecting said live truck lever and said cylinder lever.

7. In a four wheel railway car truck, a side frame member, a load carrying member extending therethrough, power means mounted on said load carrying member, supporting wheel and axle assemblies, fulcrum means mounted on one of said members, braking means comprising beams supported intermediate the wheels and carrying brake heads and brake shoes for engagement therewith, live and dead truck levers associated respectively with said beams, and an operative connection between said power means and said braking means and comprising a dead lever pivoted in said fulcrum means and connected at one end to said live truck lever, a cylinder lever fulcrumed at one end from said load carrying member and operatively connected to said power means and to said pivoted lever, and hand brake means connected to said pivoted lever.

8. In a four wheel railway car truck, a side frame, a bolster connected thereto, wheel and axle assemblies, power means mounted on said bolster and fulcrum means on said side frame adjacent said bolster, a dead horizontal lever pivoted in said fulcrum means, and braking means in the form of brake beams supported intermediate the wheels, live and dead truck levers associated with said beams respectively, said live truck lever being connected to the inner end of said fulcrumed lever, and an operative connection between said fulcrumed lever and said power means, said operative connection comprising a cylinder lever fulcrumed from said bolster end with an end connected to said fulcrumed lever, and a point intermediate its ends connected to said power means.

9. In a four wheel railway car truck, a side frame having a bolster opening, a bolster end extending therethrough, wheel and axle assemblies, power means mounted on said bolster end, fulcrum means on said frame adjacent said bolster, and braking means in the form of brake beams supported intermediate the wheels and carrying brake heads and brake shoes for engagement therewith, a live truck lever associated with one of said beams and a dead truck lever associated with the other of said beams, and an operative connection between said braking means and said power means, said connection comprising a dead lever pivoted in said fulcrum means and connected at one end to said live truck lever and operatively connected at its other end to said power means, and hand brake means operatively connected to said pivoted lever.

10. In a four wheel railway car truck, a side frame member, a load carrying member extending therethrough, power means mounted on said load carrying member, supporting wheel and axle assemblies, fulcrum means mounted on one of said members, braking means comprising beams supported intermediate the wheels and carrying brake heads and brake shoes for engagement therewith, live and dead truck levers associated respectively with said beams, and an operative connection between said power means and said braking means and comprising a dead lever pivoted in said fulcrum means and connected at one end to said live truck lever, a cylinder lever fulcrumed at one end from said load carrying member and operatively connected to said power means and to said pivoted lever.

11. In a four wheel railway truck, a truss side frame having a bolster opening, a bolster extending through said opening, spaced wheel and axle assemblies, power means mounted on said bolster outwardly of said frame, a cylinder lever fulcrumed on said bolster and operatively connected to said power means, brake rigging comprising truss beams supported intermediate said wheels and having center struts, live and dead truck levers connected respectively to said struts, and a compression rod interconnecting said truck levers, said dead truck lever being fulcrumed from said bolster and said live truck lever having an operative connection to said cylinder lever.

12. In a four wheel railway car truck, a truss side frame having a bolster opening, a bolster end projecting through said opening, wheel and axle assemblies, power means mounted on said bolster end, and brake rigging for said car truck comprising truss type brake beams supported intermediate the wheels, live and dead truck levers associated with said beams respectively, and an operative connection between said power means and said brake rigging, said operative connection comprising a bent lever fulcrumed from said side frame inwardly thereof and having its inner end connected to said live truck lever, a cylinder lever fulcrumed from said bolster and connected to said power means, and a connection between said cylinder lever and said bent lever.

13. In a four wheel railway car truck, a truss side frame having a bolster opening and fulcrum means at one side of said opening, a bolster end extending through said opening, wheel and axle assemblies, power means mounted on said bolster end, and braking means for said car truck in the form of truss type beams supported intermediate the wheels and having brake heads and brake shoes for engagement therewith, live and dead brake levers associated with said beams respectively, a bent lever pivoted in said fulcrum means and having its inner end connected to said live truck lever, a cylinder lever fulcrumed from said bolster end and connected to said power means, and a connection between said cylinder lever and said bent lever.

14. In a four wheel railway car truck, a side frame, a bolster end connected thereto, power means mounted on said bolster end, wheel and axle assemblies, fulcrum means on said frame adjacent said bolster, and braking means in the form of brake beams supported intermediate the wheels and carrying the brake heads and brake shoes for engagement therewith, a live truck lever associated with one of said beams and a dead truck lever associated with the other of said beams, and an operative connection between said braking means and said power means, said connection comprising a transversely extending dead lever pivoted in said fulcrum means and connected at its inner end to said live truck lever and operatively connected at its outer end to said power means.

15. In a four wheel railway truck, a side frame member, a load carrying member extending therethrough, supporting wheel and axle assemblies, power means mounted on said load carrying member outwardly of said frame, and braking means for said wheels in the form of beams supported intermediate the wheels and carrying brake heads and brake shoes for engagement therewith, live and dead truck levers associated with said beams respectively, fulcrum means on one of said members, and an operative connection between said power means and said braking means and comprising a dead lever pivoted in said fulcrum means and operatively connected to said power means outwardly of said side frame member and connected to said live truck lever inwardly thereof.

16. In a four wheel railway car truck, a side frame member, a load carrying member connected thereto, power means mounted on said load carrying member, supporting wheel and axle assemblies, fulcrum means mounted on one of said members, braking means comprising beams supported intermediate the wheels and carrying brake heads and brake shoes for engagement therewith, and an operative connection between said power means and said braking means and comprising a dead lever pivoted in said fulcrum means with its respective ends operatively connected to said braking means and said power means at opposite sides of said side frame member, and hand brake means connected to the inner end of said pivoted lever.

17. In a four wheel railway car truck, a truss type side frame, a bolster extending through said frame, wheel and axle assemblies, power means and fulcrum means mounted on said bolster on opposite sides of said frame, and brake rigging for said car truck in the form of truss type beams supported intermediate the wheels, a dead brake lever associated with one beam, a live brake lever associated with the other beam, a connection between said brake levers, said dead brake lever being fulcrumed from said bolster, and said live brake lever having an operative connection to said power means.

18. In a four wheel railway car truck, a side frame, a bolster end connected thereto, wheel and axle assemblies, power means mounted on said bolster end, and brake rigging for said car truck comprising truss type brake beams supported intermediate the wheels, live and dead truck levers associated with said beams respectively, and an operative connection between said power means and said brake rigging, said connection comprising a fulcrum lever pivoted from said frame inwardly thereof and operatively connected between said live truck lever and said power means.

19. In a four wheel railway car truck, a side frame member, a load carrying member connected thereto, power means mounted on said load carrying member, supporting wheel and axle assemblies, fulcrum means mounted on one of said members, braking means comprising beams supported intermediate the wheels and carrying brake heads and brake shoes for engagement therewith, and an operative connection between said power means and said braking means comprising a dead lever pivoted in said fulcrum means and operatively connected to said power means outwardly of said side frame member and to said braking means inwardly thereof.

20. In a four wheel railway car truck, a side frame, a bolster connected thereto, wheel and axle assemblies, power means mounted on said bolster and fulcrum means on said side frame adjacent said bolster, a transversely arranged dead lever pivoted in said fulcrum means, and braking means in the form of brake beams supported intermediate the wheels, live and dead truck levers associated with said beams respectively, said live truck lever being connected to the inner end of said pivoted lever, and an operative connection between said pivoted lever and said power means.

21. In a railway car truck, a side frame member, a bolster member projecting therethrough, supporting wheel and axle assemblies, power means mounted on said bolster outwardly of said frame, fulcrum means on one of said members, a transversely extending bent lever pivoted in said fulcrum means, and braking means associated with said wheels comprising interconnected live and dead truck levers, said live truck lever being connected to the inner end of said bent lever and said bent lever having an operative connection to said power means.

22. In a railway car truck, a side frame member, a transverse member, supporting wheel and axle assemblies, power means mounted on said transverse member outwardly of said side frame member, fulcrum means mounted on one of said members, braking means associated with each of said wheels including interconnected live and dead truck levers associated with brake beams intermediate the wheels, and an operative connection between said live truck lever and said power means, said operative connection comprising a transversely arranged lever supported in said fulcrum means and operatively connected at its opposite ends to said live truck lever and said power means.

23. In a railway car truck, a side frame member, a transverse member, power means mounted on said transverse member outwardly of said side frame member, fulcrum means mounted on one of said members, supporting wheel and axle assemblies, braking means associated with each wheel comprising interconnected live and dead truck levers connected to brakes associated with respective assemblies, and an operative connection between said power means and said live truck lever including a bent lever pivoted in said fulcrum means, a cylinder lever fulcrumed from one of said members and operatively connected to said power means, and a connection between said bent lever and said live truck lever.

WALTER H. BASELT.